Nov. 9, 1954  R. BRIDGE  2,693,890
LOADING AND UNLOADING DEVICE FOR VEHICLES
Filed May 24, 1952

Inventor:
Rex Bridge
By [signature]
Attorney

United States Patent Office 2,693,890
Patented Nov. 9, 1954

2,693,890

LOADING AND UNLOADING DEVICE FOR VEHICLES

Rex Bridge, Belleville, Ontario, Canada, assignor to Joseph Paiement, Pointe Claire, Quebec, Canada Application May 24, 1952, Serial No. 289,809

2 Claims. (Cl. 214—82)

The present invention pertains to a novel loading and unloading device and is directed more particularly to improvements in the floor scraper shown in United States Patent No. 2,218,121 of October 15, 1940, and Canadian Patent No. 383,644 of August 29, 1939, to J. Paiement.

The loading and unloading device is in the nature of a transverse wall movable lengthwise on the floor of a truck or other vehicle. When the vehicle is loaded, the movable wall constitutes the forward wall, and a conventional rear wall is removably mounted on the rear end. To unload the vehicle, the conventional wall is removed, and the movable wall is propelled by suitable means from the front end of the vehicle floor to the rear end, thereby dumping the load.

In handling loose material such as coal, garbage and the like, an efficient scraper on the lower edge of the movable wall is very desirable. This invention consists in improvements in the scraper employed in the aforementioned patents.

In this connection one of the objects of the invention is to provide a scraper that will automatically yield and change its shape as it exerts pressure against the load. As the pressure increases the scraper buckles on an intermediate hinge and accomplishes two functions in this adjustment. First, the lower or working portion of the scraper approaches a nearly horizontal position, in which the scraping action is more efficient. Again, the buckling of the scraper increases the available volume, which is especially desirable when the vehicle is fully loaded and the load pressure is high.

Figure 1:
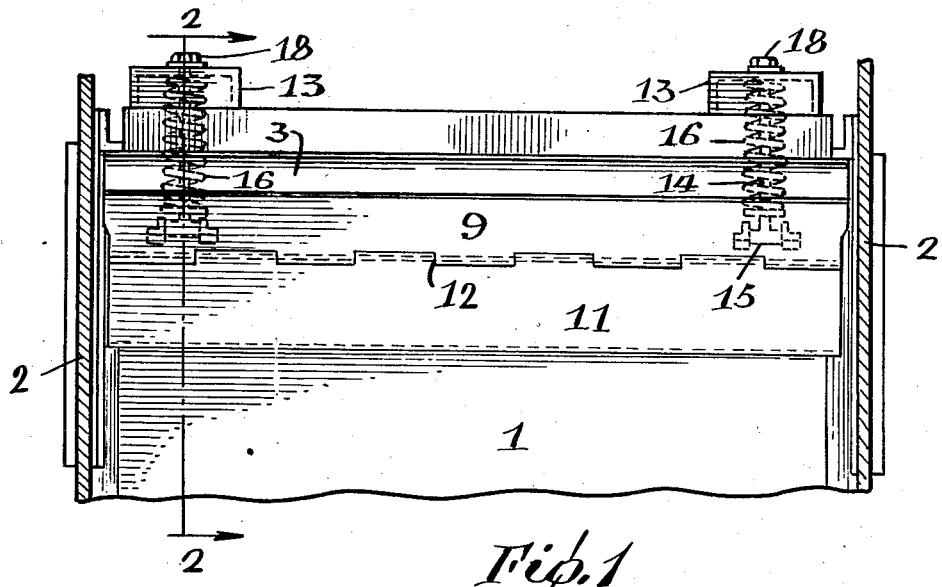
Figure 2:
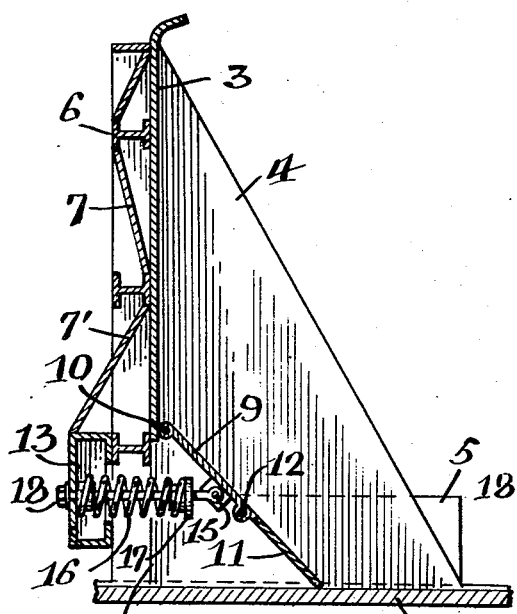

The invention is fully disclosed by way of example in the following description and in the accompanying drawings in which:

Figure 1 is a plan view of the device;
Figure 2 is a section on the line 2—2 of Figure 1; and
Figure 3 is a similar section showing the scraper under pressure.

Reference to these views will now be made by use of like characters which are employed to designate corresponding parts throughout.

Figure 3:
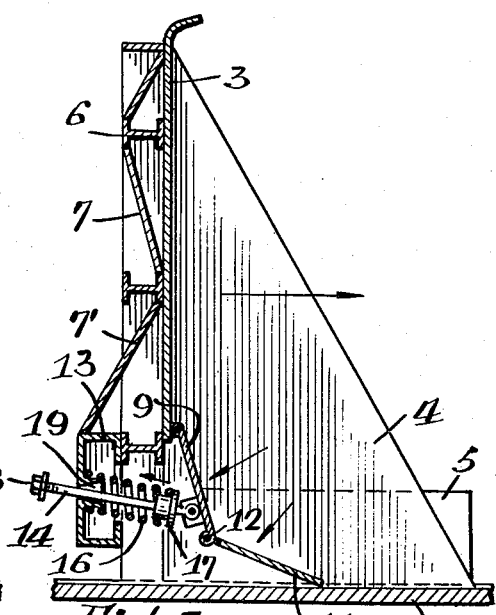

In Figures 2 and 3 is shown the floor 1 of a vehicle such as a truck. The side walls 2 of the vehicle shown in Figure 1 are omitted from Figures 2 and 3 for clarity. Between the side walls is a movable transverse wall 3 reinforced by end wings 4. At the bottom of each wing is a truck or frame 5 adapted to roll on a suitable support along the corresponding edge of the floor 1. Such a support is shown in the aforementioned patents.

The wall 3 is further reinforced by horizontal I-beams 6 on its forward facing surface with diagonal bracing plates 7 between the beams. The wall or plate 3 is spaced at 8 from the floor 1 for a purpose that will presently be described. Depending from the lower edge of the wall 3 is a scraper comprising a transverse plate 9 having its upper end hinged at 10 to the lower edge of the wall 3 and a lower plate 11 hinged at 12 to the lower edge of the plate 9. The lower edge of the plate 11 rests on the floor 1.

The lowest brace plate 7' in conjunction with the lowest beam 6 supports a box 13 at each end of the opening 8. Rods 14 are hinged at 15 to the plate 9 and extend slidably through the respective boxes 13. Each rod is surrounded by a coil spring 16 having one end bearing against a collar 17 on the rod and the other end in a wall of the box 14. The free end of the rod, outside the box, carries a nut 18 which will not pass through the opening 19 in which the rod slides.

In the use of the device, when the scraper is under light pressure the springs 16 are strong enough to prevent buckling and to maintain the plates 9 and 11 alined with each other as in Figure 2. The blade is now at an efficient scraping angle for relatively light loads at a relatively high rate of travel of the movable wall 3. However, when the wall 3 is at the forward end of the floor 1 and the vehicle heavily loaded, the scraper buckles against the pressure of the springs 16 as in Figure 3. The angle formed between the plates 9 and 11 increases the available carrying capacity of the vehicle. Also, the reduced angle of the plates 11 to the floor is more efficient in scraping a heavy load while the wall 3 is being moved slowly. Eventually the load pressure diminishes until the springs 16 restore the position as shown in Figure 2, so that no material is trapped in the angle that was previously formed by the plates 9 and 11.

Certain loads may be pulled on the floor by first bringing the wall 3 to the rear end of the floor, tying the load to the wall and then pulling the wall forward under power.

Although a specific embodiment of the invention has been illustrated and described, it will be understood that various alterations in the details of construction may be made without departing from the scope of the invention as indicated by the appended claims.

What I claim is:

1. In a loading and unloading device wherein a transverse wall moves along a floor, a pair of scraper plates at the lower edge of said wall, one of said plates being hinged to said wall along a line spaced from said floor and the other plate being hinged to the lower edge of the first plate, a pair of rods hinged to one of said plates, backing members at the lower portion of said wall, said rods passing slidably through said members, fixed collars on said rods, and a spring on each rod and bearing against the corresponding backing member and collar, holding said plates alined with each other under light opposing load pressure, whereby said plates form an angle under higher opposing pressure.

2. In a loading and unloading device wherein a transverse wall moves along a floor, a pair of scraper plates at the lower edge of said wall, the upper plate being hinged to said wall along a line spaced from said floor and the other plate being hinged to the lower edge of the first plate, a pair of rods hinged to one of said plates, backing members at the lower portion of said wall, said rods passing slidably through said members, fixed collars on said rods, and a spring on each rod and bearing against the corresponding backing member and collar, holding said plates alined with each other under light opposing load pressure, whereby said plates form an angle under higher opposing pressure.

References Cited in the file of this patent

UNITED STATES PATENTS

| Number | Name | Date |
| --- | --- | --- |
| 2,258,988 | Le Laurin | Oct. 14, 1941 |
| 2,284,661 | Joy | June 2, 1942 |
| 2,298,982 | Smith | Oct. 13, 1942 |
| 2,569,161 | Golay | Sept. 25, 1951 |
| 2,605,915 | Day | Aug. 5, 1952 |

FOREIGN PATENTS

| Number | Country | Date |
| --- | --- | --- |
| 42,409 | France | Apr. 25, 1933 |
| | (Addition to No. 739,322) | |